United States Patent

Ura et al.

[11] Patent Number: 6,112,842
[45] Date of Patent: Sep. 5, 2000

[54] WORKING VEHICLE

[75] Inventors: Takeshi Ura, Nara; Akio Inamora, Izumi, both of Japan

[73] Assignee: Kubota Corporation, Japan

[21] Appl. No.: 09/247,794

[22] Filed: Feb. 8, 1999

[30] Foreign Application Priority Data

Feb. 10, 1998 [JP] Japan .................................. 10-028308

[51] Int. Cl.$^7$ .................................................. B60K 17/34
[52] U.S. Cl. .............................. 180/233; 172/2; 303/186; 303/190; 701/69; 701/89
[58] Field of Search .................................... 180/244, 248, 180/249, 6.24, 233; 303/143, 186, 189, 190; 701/50, 69, 89, 81; 172/2, 75, 458

[56] References Cited

U.S. PATENT DOCUMENTS

| | | | |
|---|---|---|---|
| 4,696,365 | 9/1987 | Ishimori et al. | 180/233 |
| 5,195,037 | 3/1993 | Tezuka | 180/248 |
| 5,272,635 | 12/1993 | Nakayama | 180/233 |
| 5,383,531 | 1/1995 | Yoshioka et al. | 180/233 |
| 5,558,163 | 9/1996 | Hollstein | 172/2 |

FOREIGN PATENT DOCUMENTS

| | | |
|---|---|---|
| 4110233 | 8/1990 | Japan . |
| 7164902 | 12/1993 | Japan . |

*Primary Examiner*—Anne Marie Boehler
*Attorney, Agent, or Firm*—Webb Ziesenheim Logsdon Orkin & Hanson, P.C.

[57] ABSTRACT

A working vehicle such as an agricultural tractor includes a control device having an accelerating drive mode to accelerate front wheels automatically to rotate faster than rear wheels when the front wheels are steered in excess of a fixed amount. When the rotating speed of an engine falls below a predetermined value, a shift to the accelerating drive mode is inhibited to avoid an engine stall.

10 Claims, 6 Drawing Sheets

WORKING VEHICLE

BACKGROUND OF THE INVENTION

1. Field of the Invention

This invention relates to an apparatus for controlling a working vehicle.

2. Description of the Related Art

One example of conventional apparatus for controlling a working vehicle is disclosed in Japanese Patent Laying-Open Publication H7-125553. In this conventional construction, when a steering angle of front wheels measured by a front wheel steering angle sensor exceeds a predetermined angle during a low-speed run, the front wheels are accelerated and a rear wheel lying inwardly of the turn is braked.

With an agricultural tractor which is one example of working vehicles, the engine usually is maintained at high rotating speed to avoid engine stalling during an operation in heavy load conditions. Conversely, the engine is set to a low rotating speed in a non-operating state such as road running. In the conventional example noted above, the front wheels are accelerated and a rear wheel lying inwardly of a turn is braked automatically based on a running speed of the vehicle. This entails an inconvenience that, also during a road run with the engine set to a low rotating speed, the front wheels are accelerated and a rear wheel lying inwardly of a turn is braked automatically when the front wheels are steered in excess of a predetermined angle. When this happens, the engine undergoes an excessive load, which could result in inadvertent engine stalling.

SUMMARY OF THE INVENTION

An object of this invention is to provide a working vehicle free from engine stalling even when the engine is rotating at low speed and the front wheels are steered by a large angle.

The above object is fulfilled, according to this invention, by a working vehicle comprising an engine, an engine speed sensor disposed at an output side of the engine, a pair of right and left rear wheels driven by the engine, a braking device for braking the pair of right and left rear wheels independently of each other, a pair of dirigible front wheels drivable by the engine, a controller operable, when the pair of front wheels are steered in excess of a predetermined angle, for setting an accelerating drive mode to rotate the front wheels at a substantially higher peripheral speed than the rear wheels, and an inhibiting device for inhibiting a shift to the accelerating drive mode when an output from the engine speed sensor indicates that a rotating speed of the engine is below a predetermined value.

When the engine is rotating at low speed below the predetermined value, the inhibiting device inhibits the accelerating drive mode of the front wheels even if the front wheels are steered. This avoids an excessive load being applied to the engine.

Preferably, therefore, the inhibiting device is operable for canceling the accelerating drive mode when the front wheels are driven in the accelerating drive mode and the rotating speed of the engine falls from above the predetermined value below the predetermined value.

It is also preferred that the inhibiting device is operable for inhibiting the accelerating drive mode when the rotating speed of the engine is below the predetermined value, and continuously inhibiting the accelerating drive mode when, with the accelerating drive mode being inhibited, the rotating speed of the engine is increased above the predetermined value.

With the above construction, even when the rotating speed of the engine exceeds the predetermined value, the front wheels are never accelerated while the vehicle is making a turn. A selected turning mode is maintained until the turn is completed.

The controller may be operable, when the front wheels are steered in excess of the predetermined angle, for causing the braking device to brake one of the rear wheels lying inwardly with respect to a steering direction. This enables the vehicle to make a turn with a reduced radius.

The controller may be operable, when the front wheels are steered in excess of the predetermined angle, for automatically raising a working implement attached to the working vehicle to a set position. This provides an advantage that, since the working implement is raised automatically when the vehicle makes a turn, there is no need to operate a switch for raising the working implement.

DETAILED DESCRIPTION OF THE PREFERRED EMBODIMENT

An embodiment of this invention will described hereinafter with reference to the drawings.

In this embodiment, the invention is described by using an agricultural tractor as one example of working vehicles.

Figure 1:
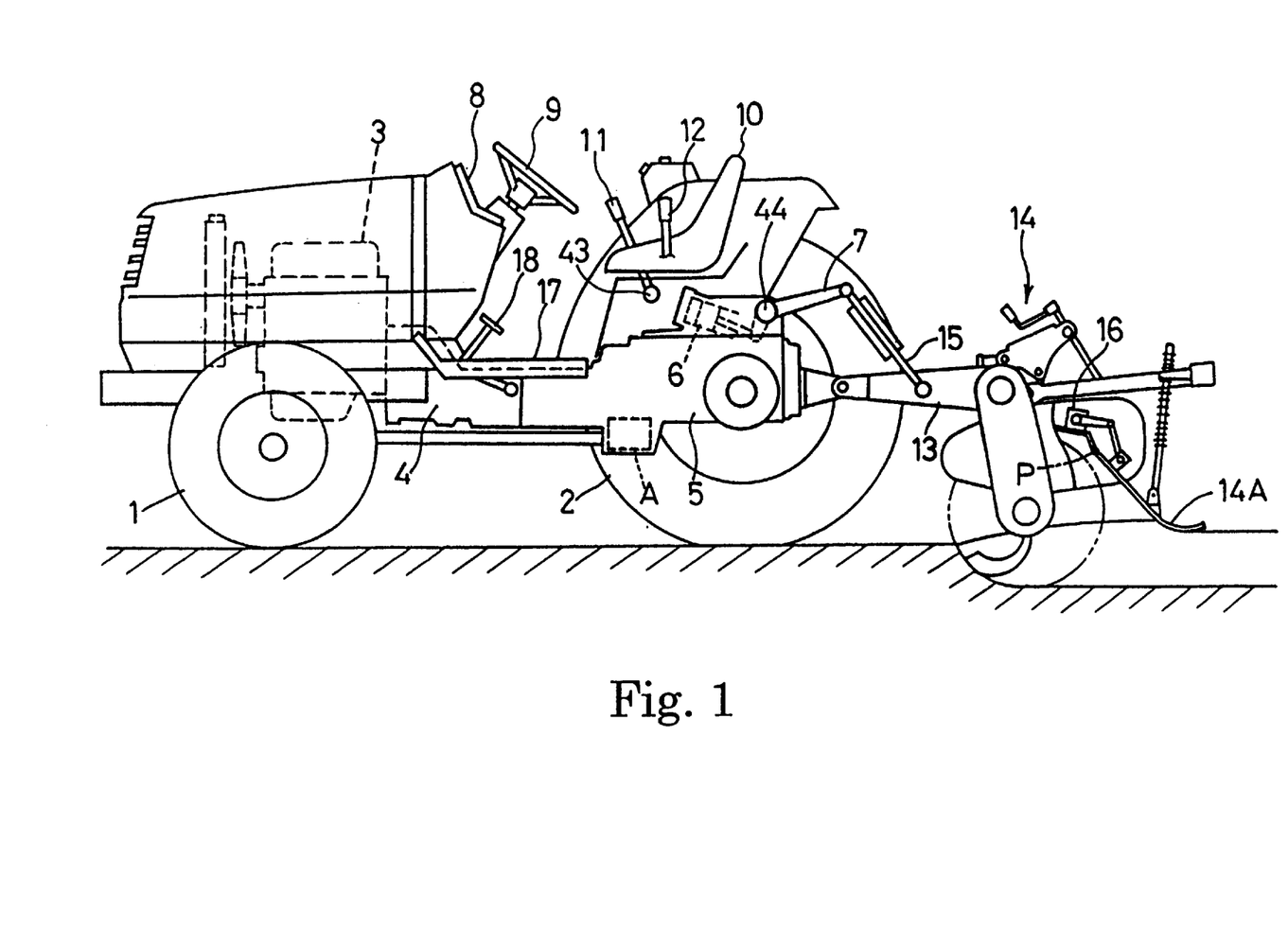
FIG. 1 is a side elevation of a tractor which is one example of working vehicles according to this invention.
Figure 2:
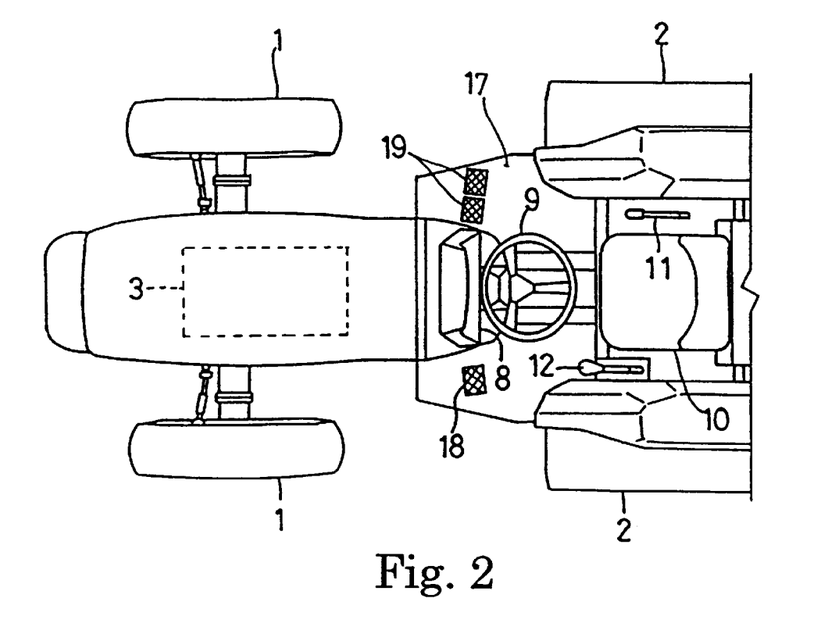
FIG. 2 is a plan view of a front portion of the tractor shown in FIG. 1.

As shown in FIGS. 1 and 2, an agricultural tractor includes a vehicle body with front wheels 1 and rear wheels 2 and having an engine 3 mounted in a front position thereof. Power of the engine 3 is transmitted, through a main clutch mounted in a main clutch housing 4 to a transmission case 5 disposed in a rearward position of the vehicle body. A pair of right and left lift arms 7 are connected to upper rear positions of the transmission case 5 to be vertically pivotable by a lift cylinder 6. The vehicle body includes a meter panel 8, a steering wheel 9 and a driver's seat 10 arranged in a central region thereof. Further, a position lever 11 is disposed at the right side of the driver's seat 10 for controlling the lift arms 7. A main shift lever 12 is disposed at the left side of the driver's seat 10 for controlling a change speed device in the transmission case 5.

A rotary plow 14 acting as a ground-working implement is separably coupled to the rear end of the vehicle body through a two-point link mechanism 13. A pair of right and left lift rods 15 extend between the two-point link mechanism 13 and the right and left lift arms 7. The rotary plow 14 is raised and lowered by the drive of lift cylinder 6. The rotary plow 14 has a ground-engaging rear cover 14A attached to the rear end thereof to be oscillatable about an axis P extending transversely of the vehicle body. A potentiometer type cover sensor 16 is provided to measure a height above the ground of the rotary plow 14 by detecting an oscillating position of the rear cover 14A.

As shown in FIG. 2, a main clutch pedal 18 is disposed in a leftward region of a driver's platform 17, which is depressable to disengage the main clutch. A pair of right and left side brake pedals 19 are disposed in a rightward region of the driver's platform 17 for braking the right and left rear wheels 2 independently of each other. A steering control system is provided for transmitting an operating force of steering wheel 9 to the right and left front wheels 1 through a power steering mechanism (not shown).

Figure 3:
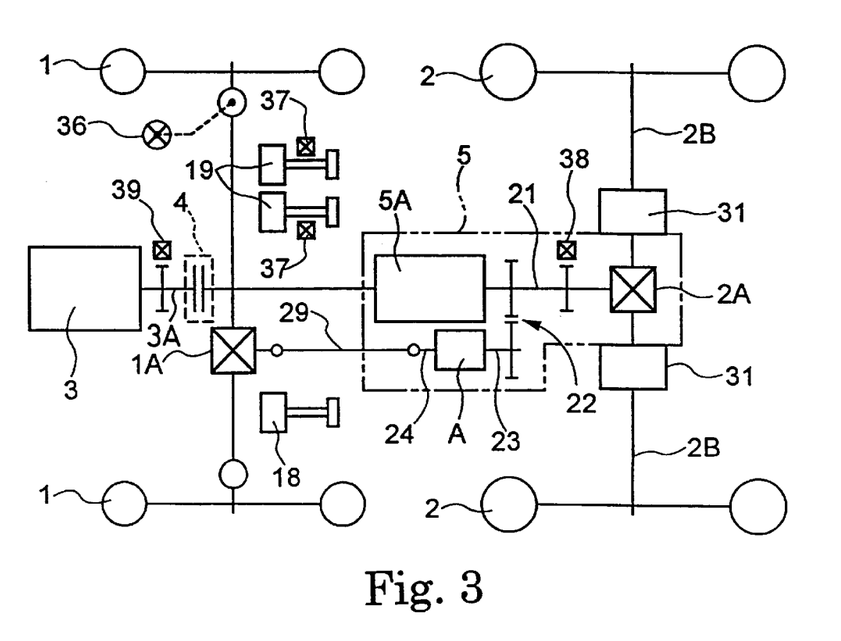
FIG. 3 is a plan view of a transmission system of the tractor.
Figure 4:
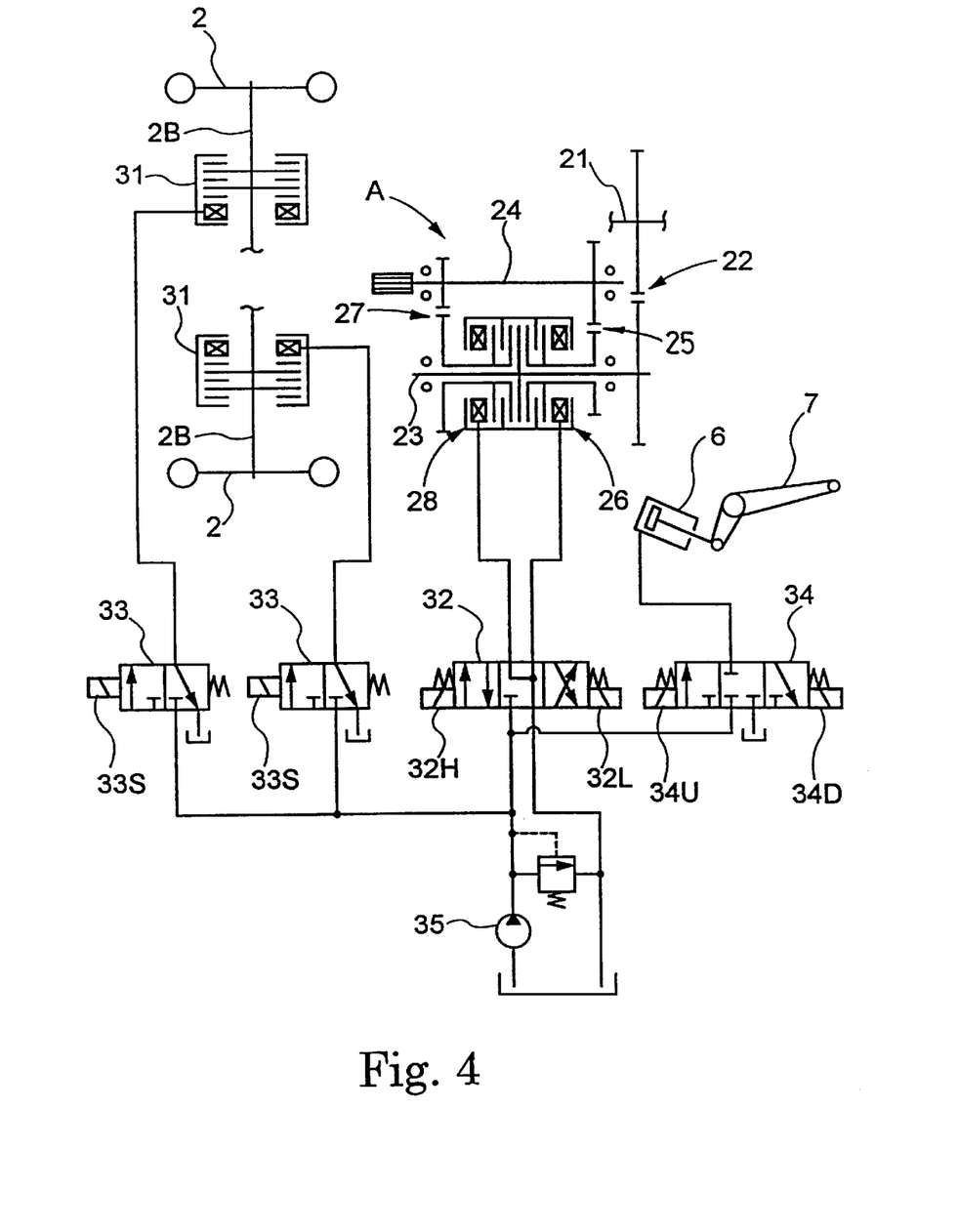
FIG. 4 is a circuit diagram of a hydraulic system of the tractor.

As shown in FIGS. 1, 3 and 4, a front wheel change speed device A is disposed in a lower position of transmission case 5. The front wheel change speed device A is operable to provide an equal speed mode for driving the front wheels 1 and rear wheels 2 at a substantially equal peripheral speed, an accelerating mode (also referred to as a double-speed mode as explained later) for driving the front wheels 1 at a substantially faster peripheral speed than the rear wheels 2 so that the tractor may make a turn with a small radius, and a two wheel drive mode for breaking power transmission to the front wheels 1.

In a normal operation, the front wheels 1 are driven at substantially the same peripheral speed as the rear wheels 2. In this equal speed mode, the front wheels 1 and rear wheels 2 may be driven at slightly different peripheral speeds. The term "substantially the same peripheral speed" includes a case where the peripheral speed of front wheels 1 is within an error range of 5% with respect to the peripheral speed of rear wheels 2. The peripheral speed of front wheels 1 should desirably be within an error range of 3% of the peripheral speed of rear wheels 2. It is more preferable that the front wheels 1 are driven at a peripheral speed 2 to 3% faster than the rear wheels 2.

Thus, the accelerating mode for driving the front wheels 1 at a substantially faster peripheral speed than the rear wheels 2 means that the front wheels 1 are driven at a peripheral speed at least 30% faster than the rear wheels 2. Preferably, the front wheels 1 are driven, in this state, at a peripheral speed between 50% and 100% faster than the rear wheels 2.

As shown in FIG. 3, power is transmitted from a change speed device 5A in the transmission case 5 to a differential 2A of rear wheels 2 through an input shaft 21. Power is transmitted from the input shaft 21 also to an intermediate shaft 23 through an interlocking gear mechanism 22. As shown in FIG. 4, the front wheel change speed device A has a front wheel drive shaft 24 extending parallel to the intermediate shaft 22, a friction type multidisk standard clutch 26 for transmitting power from the intermediate shaft 23 to the front wheel drive shaft 24 through a standard gear mechanism 25, and a friction type multidisk accelerating clutch 28 for transmitting power from the intermediate shaft 23 to the front wheel drive shaft 24 through an accelerating gear mechanism 27. The standard clutch 26 and accelerating clutch 28 are engageable by pressure oil supplied thereto. Power is transmitted from the forward end of front wheel drive shaft 24 to a differential 1A of front wheels 1 through an intermediate transmission shaft 29.

As shown in FIG. 4, friction type side brakes 31 are provided to act as braking apparatus for applying braking forces to axles 2B of right and left rear wheels 2. Each side brake 31 has an internal piston operable by a pressure oil supply to press friction disks against each other for applying a braking force proportional to a pressure of pressure oil to the rear wheel 2. An electromagnetically operable selector valve 32 is provided for controlling the pressure oil supplied to the standard clutch 26 and accelerating clutch 27. The hydraulic system further includes right and left electromagnetic proportional brake valves 33 for controlling the right and left side brakes 31, respectively, and an electromagnetically operable lift valve 34 for controlling the pressure oil supplied to the lift cylinder 6. Pressure oil is supplied to these valves 32, 33 and 34 from a hydraulic pump 35 driven by the engine 3. The brake valves 33 are the electromagnetic proportional type, each of which opens to a degree proportional to an electric current supplied to a solenoid.

As shown in FIG. 3, the agricultural tractor includes a potentiometer type steering sensor 36 for measuring a steering amount of the steering control system. Further, brake sensors 37 are disposed adjacent the right and left side brake pedals 19 for detecting depression thereof. A pickup type vehicle speed sensor 38 (one example of vehicle speed determining means) is disposed adjacent a gear mounted on the input shaft 21 which transmits power to the differential 2A of rear wheels 2, for measuring a running speed of the tractor.

A pickup type engine speed sensor 39 is disposed adjacent a gear mounted on an output shaft 3A of engine 3 for measuring a rotating speed of engine 3. That is, an engine speed sensor 39 is provided at the output side of engine 3 for measuring a rotating speed of engine 3.

Figure 5:
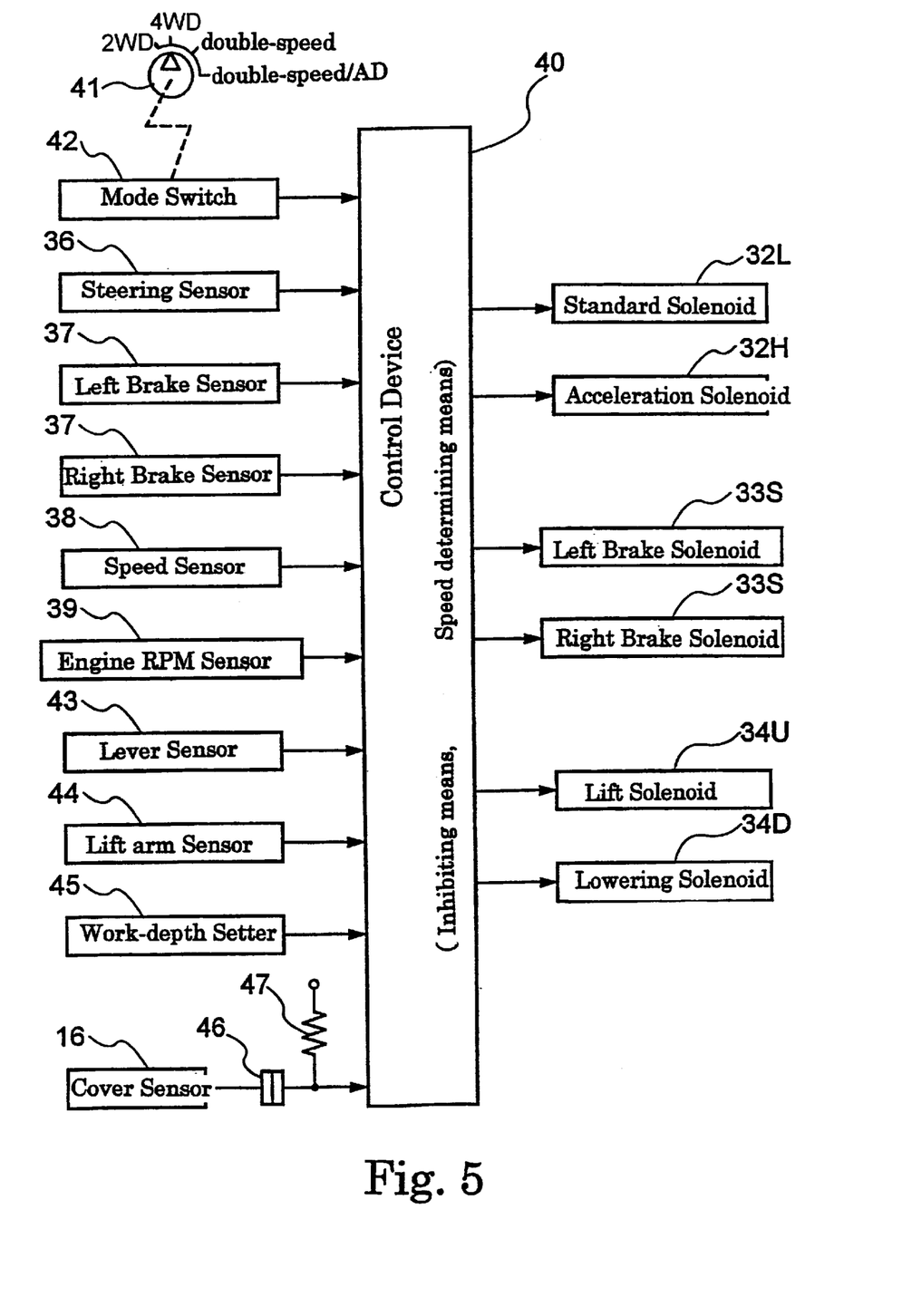
FIG. 5 is a block diagram of a control system.

The meter panel 8 has a dial 41, as shown in FIG. 5, for setting the drive modes of front wheels 1. This dial 41 may be set to a "2WD" position for driving only the rear wheels 2, a "4WD" position for providing the equal speed mode noted hereinbefore, a "double-speed" position for providing the accelerating mode, when the front wheels 1 are steered in excess of a predetermined angle, to transmit accelerated power from the front wheel change speed device A to the front wheels 1, and a "double-speed/AD" position, when the front wheels 1 are steered in excess of the predetermined angle, to transmit accelerated power from the front wheel change speed device A to the front wheels 1 and to operate the side brake 31 of the rear wheel 2 lying inwardly of the turn. In the present specification, the term "double-speed" is used only because it is a common term used in the actual practitioners of the technology. On the contrary, the use of the term "double-speed" should not be interpreted to mean that the peripheral speed of the front wheels 1 are exactly double the peripheral speed of the rear wheels 2 under this mode.

As shown in FIG. 5, this tractor includes a controller 40 having a microprocessor to act as a control device. FIG. 5 shows, at the left side thereof, signals inputted to the controller 40 from varied sensors. These sensors include a mode switch 42 for determining a set position of dial 41, steering sensor 36, right and left brake sensors 37, vehicle speed sensor 38, engine speed (or RPM) sensor 39, a potentiometer type lever sensor 43 for measuring a control position of position lever 11, a potentiometer type lift arm sensor 44 for measuring a pivoting amount of lift arms 7, a potentiometer type plowing depth setter 45 (or work depth setter) for setting a target plowing depth of rotary plow 14, and the cover sensor 16.

The controller 40 outputs signals to a standard solenoid 32L for operating the selector valve 32 to engage the standard clutch 26, an accelerating solenoid 32H for operating the selector valve 32 to engage the accelerating clutch 28, brake solenoids 33S for operating the brake valves 33, respectively, a raising solenoid 34U (or lift solenoid) for operating the lift valve 34 to a raising position, and a lowering solenoid 34D for operating the lift valve 34 to a lowering position.

A disconnectable coupler 46 is mounted on an input signal line from the cover sensor 16 to the controller 40, whereby the signal line may be disconnected when the rotary plow 14 is detached from the tractor. A pull-up resistor 47 is provided on the signal line between the coupler 46 and the controller 40. Thus, when the coupler 46 is disconnected, the voltage on the signal line is raised to a source voltage, whereby the disconnection of coupler 46 is determined from the voltage state.

When the position lever 11 is operated, the position of position lever 11 measured by the lever sensor 43 is set to a target height relative to the vehicle body. A position control is carried out for vertically moving the rotary plow 14 until the signal value measured by the lift arm sensor 44 falls in a deadband formed based on the above target height. An automatic plowing depth control is started when the position lever 11 is set to a lowermost position. In this automatic plowing depth control, the plowing depth setter 45 sets a target plowing depth with reference to the ground, and the rotary plow 14 is vertically moved until the signal value measured by the cover sensor 16 falls in a deadband formed based on the target plowing depth.

The controller 40 has programs set thereto for executing, besides the above lift control of rotary plow 14, controls of front wheel change speed device A and side brakes 31. Specifically, as shown in the flow chart of FIG. 6, the controller 40 takes in the signal from the mode switch 42 and determines a drive mode of front wheels 1. When, for example, this signal indicates the "2WD" position, the controller 40 operates the selector valve 32 to neutral position to maintain the state of no power transmission to the front wheels 1 (steps #101–#103). When the mode switch 42 indicates the "4WD" position, the controller 40 drives the standard solenoid 32L of selector valve 32 to maintain the four wheel drive mode (steps #104 and #105). Otherwise, the standard solenoid 32L of selector valve 32 is driven to provide the four wheel drive mode. Further, the controller 40 takes in the signal from the vehicle speed sensor 38, and determines whether a running speed of the tractor is below a predetermined value. It is also determined based the signal from the lift arm sensor 44 whether the lift arm 7 is below an upper limit. It is further determined whether the signal from the cover sensor 16 is in a predetermined voltage region, and whether the rotary plow 14 is coupled to the tractor. When all these prove affirmative (steps #106–#112), a turn control routine is executed (step #200). When these conditions are not met, the standard solenoid 32L of selector valve 32 continues to be driven to maintain the four wheel drive mode. This state is maintained until a reset operation takes place (step #113). The predetermined value for the vehicle speed is preferably between 5 km and 15 km per hour. The value is more preferably set to fall between 8 km and 12 km per hour such as 10 km/h.

Figure 6:
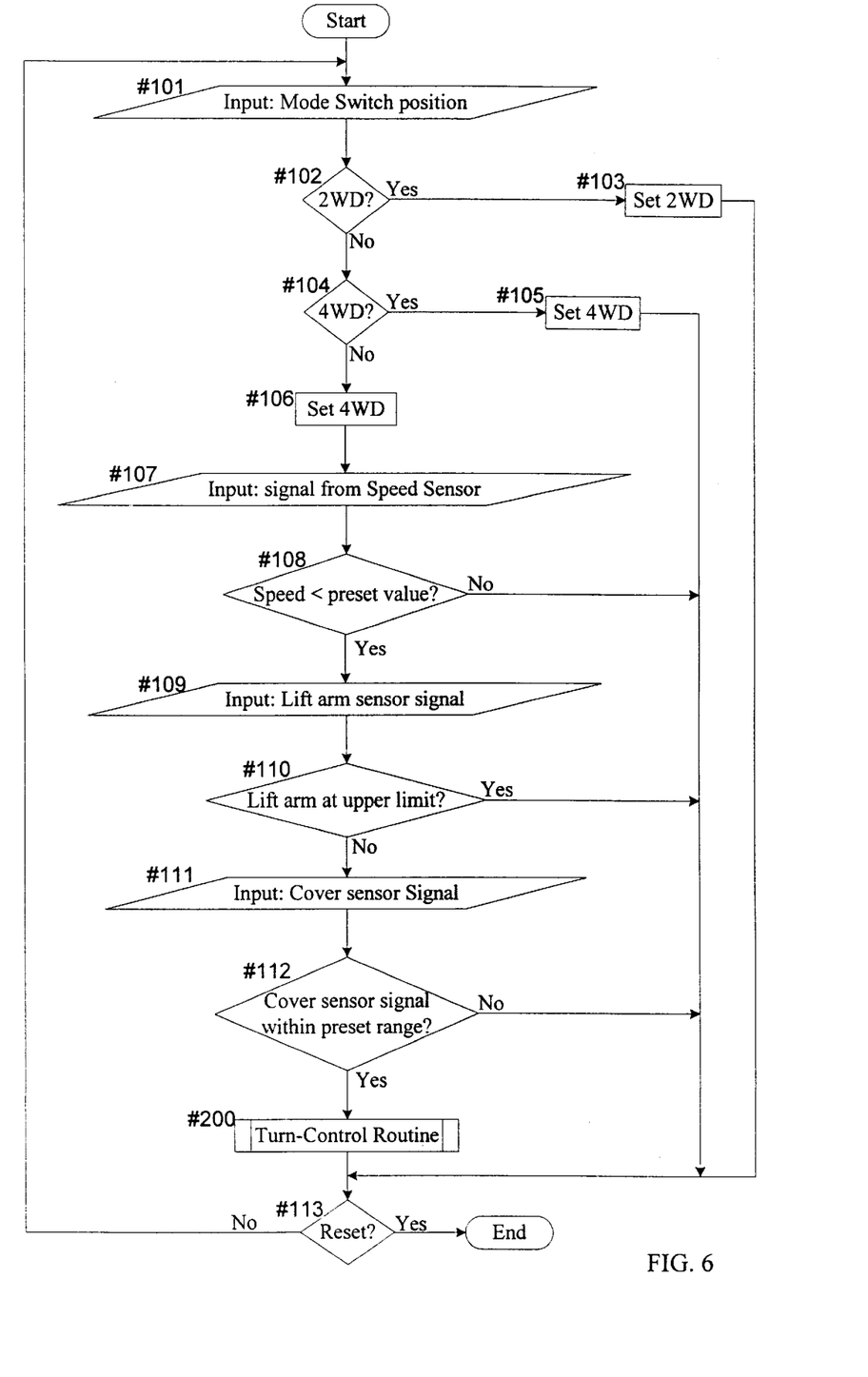
FIG. 6 is a flow chart showing a control operation.

The turn control routine is not executed when the running speed of the tractor is above the predetermined value, in order to avoid an imbalance of the vehicle body due to a small radius turn made at high speed. The turn control routine is not executed when the lift arm 7 is at the upper limit. The reason is that a small radius turn is unnecessary during a non-operational run with the rotary plow or other earth-working implement raised to the upper limit. The turn control routine is not executed when the signal from the cover sensor 16 is outside the predetermined voltage region. The reason is that, when the controller 40 receives a signal voltage raised near the source voltage, this indicates an inoperative state with the rotary plow 14 disconnected from the tractor and a small radius turn is unnecessary in such a state.

Figure 7:
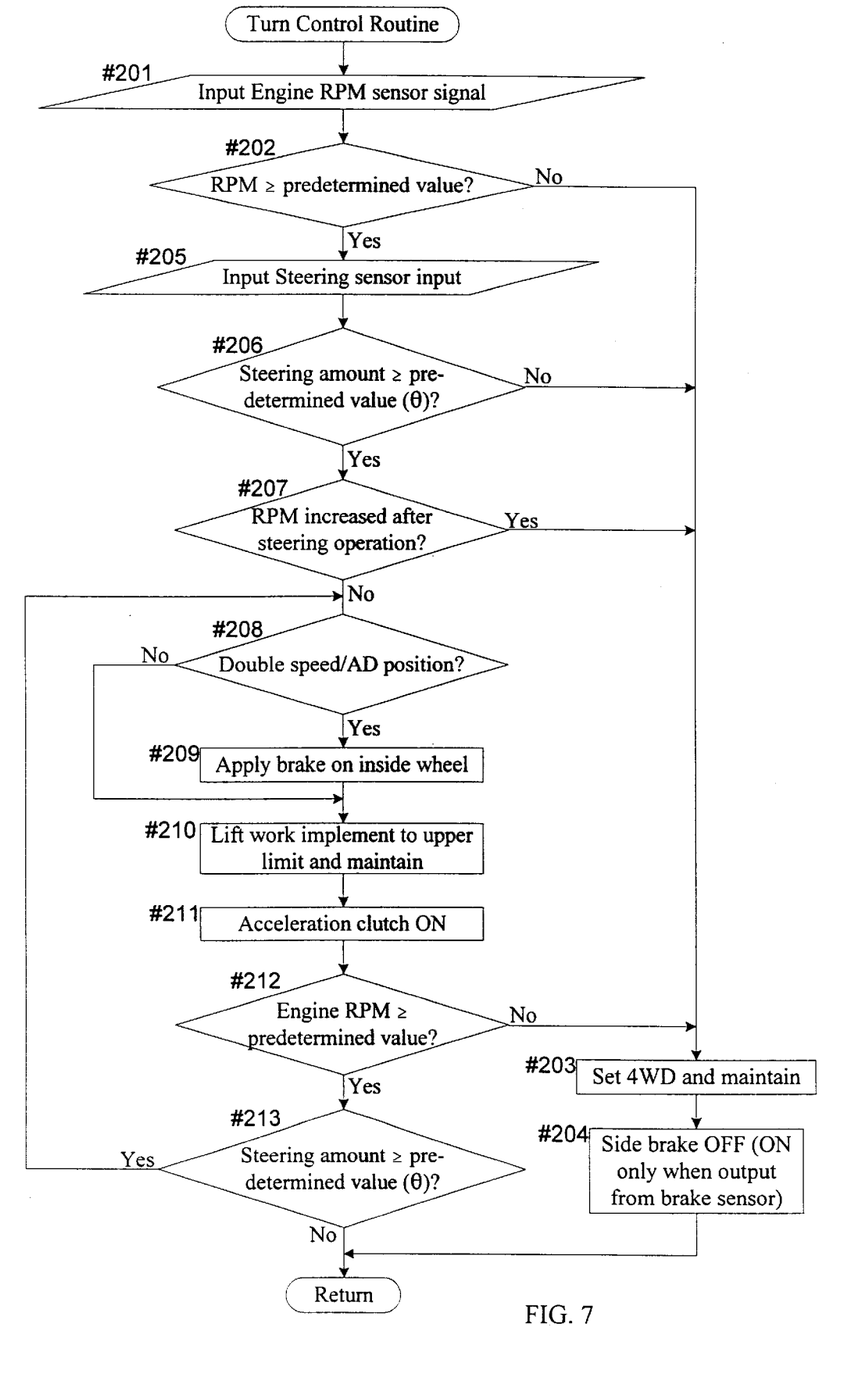
FIG. 7 is a flow chart of a turn control routine.

In the turn control routine (step #200), as shown in the flow chart of FIG. 7, when the signal from the engine speed sensor 39 indicates a rotating speed of engine 3 below a predetermined value, and when the signal from the steering sensor 36 indicates that the front wheels 1 are not steered in excess of a predetermined angle θ, even if the rotating speed of engine 3 is above the predetermined value, the brake valves 33 are set to neutral to maintain the side brakes 31 out of action (when one of the brake sensors 37 detects depression of the side brake pedal 19, only the corresponding side brake 31 is operated). The predetermined angle θ is preferably between 30 degrees and 40 degrees, and more preferably between 34 degrees and 36 degrees. The standard solenoid 32L of selector valve 32 continues to be driven to maintain the four wheel drive mode (steps #201–#206).

The turn control routine is not executed when the rotating speed of engine 3 is below the predetermined value, in order not only to avoid engine stalling due to a load increase resulting from a front wheel acceleration, but to avoid also an unnecessary front wheel acceleration by determining from the rotating speed of engine 3 that the tractor is running on the road where the rotating speed of engine 3 is lowered more frequently than when the tractor is in an earth-working operation. Assume, for example, that the rotating speed of engine 3 is below the predetermined value at a point of time the front wheels 1 begin to be steered, and that an operation is carried out to increase the rotating speed of engine 3 while the front wheels 1 are being steered. Then, the rotating speed of engine 3 may exceed the predetermined value with the front wheels 1 steered in excess of the predetermined angle θ. In such a case also, the acceleration of front wheels 1 and operation of side brakes 31 are suppressed in order to avoid an inconvenience of reducing a turning radius and starting a small, sharp turn while the steering wheel 9 is not operated.

Next, when the signal from the steering sensor 36 indicates that the front wheels 1 are steered in excess of the predetermined angle θ, excluding the case where the rotating speed of engine 3 reaches the predetermine value after starting the steering operation, and only when the mode switch 42 indicates the "double speed/AD" position, the solenoid 33S of brake valve 33 connected to the side brake 31 lying inwardly of the turn is driven to operate this side brake 31, the rotary plow 14 is automatically raised to the set position (e.g. the upper limit), and the accelerating solenoid 32H of selector valve 32 is driven to engage the accelerating clutch 28 of front wheel change speed device A to accelerate the front wheels 1 (steps #205–#211). Since the steering angle is beyond a predetermined value, the work implement such as the rotary plow 14 is raised automatically to the predetermined position, the operator does not need to raise it manually every time she or he makes a turn. When the side brake 31 is operated after accelerating the front wheels 1 as above, the rotating speed of engine 3 may fall below the predetermined value. In this case, the acceleration of front wheels 1 and operation of side brake 31 are discontinued immediately. When no such lowering of the rotating speed of engine 3 occurs, the acceleration of front wheels 1 and operation of side brake 31 are ended upon determination that the front wheels 1 have returned to an angle smaller than the predetermined angle θ (steps #212 and #213). Also when the rotating speed of engine 3 falls while the tractor is making a turn, the acceleration of front wheels 1 and operation of side brake 31 are stopped to avoid engine stalling. The program for stopping acceleration of front wheels 1 based on the rotating speed of engine 3 constitutes an inhibiting device. This program for the inhibiting device performs also the control to inhibit operation of the side brake 31 to act on the rear wheel 2 lying inwardly of a turn. The engine speed sensor 38, and the program set to the controller 40 for determining a rotating speed of engine 3 from the signal received from the sensor 38, constitute a rotating speed determining device.

Each brake valve 33 is in the form of an electromagnetic proportional valve which opens to a degree proportional to an electric current supplied to the solenoid 33S. Consequently, its braking force may be adjusted by the current supplied to the solenoid 33S. Though not shown in the flow chart, the control operation of controller 40 is set such that, the higher the running speed, the greater current is supplied to the solenoid 33S, whereby the piston of each brake 31 is actuated quickly to shorten the time taken before a start of braking action for allowing a turn to be made at a desired position. In addition, the controller 40 is operable to transmit an intermittent signal to the solenoid 33S. This intermittent signal has a duty ratio which may be set to adjust, in PWM mode, the current supplied to the solenoid 33S. To control the current with high precision, the control operation of controller 40 is set to derive a pressure of hydraulic oil supplied from the hydraulic pump 35, from the rotating speed of engine 3 measured by the engine speed sensor 39, to correct the current supplied to the solenoid 33$s$ of brake valve 33.

When the tractor engages in an operation with the mode switch 42 set to the "double-speed" position or "double-speedlAD" position, a small radius turn may be made by accelerating the front wheels 1, or by accelerating the front wheels 1 and braking the rear wheel 2 lying inwardly of the turn, automatically in response to a steering operation. Further, also when, for example, the tractor runs on the road with the rotary plow 14 not raised to the upper limit, and with the mode switch 42 set to the "double-speed" position or "double-speed/AD" position, acceleration of front wheels 1 and braking of the rear wheel 2 lying inwardly of a turn are suppressed based on the tractor's running speed and the rotating speed of engine 3. Thus, an imbalance of the vehicle body due to a small radius turn made during a high-speed run and an unnecessary small radius turn are avoided, thereby allowing a steering operation to be performed in a comfortable way without a sense of incongruity. A small radius turn made by accelerating the front wheels 1 and braking the rear wheel 2 lying inwardly of the turn is started only when the engine 3 is rotating at high speed. It is thus possible to suppress an unnecessary control and avoid the inconveniences of tipping the vehicle body balance and of engine stalling by determining from the rotating speed of engine 3 that the tractor is not engaged in a earth-working operation. In addition, when the rotating speed of engine 3 falls below the predetermined value during a small radius turn, acceleration of front wheels 1 and braking of the rear wheel 2 lying inwardly of a turn are stopped to avoid engine stalling. Also when the driver increases the rotating speed of engine 3 while turning the tractor by operating the steering wheel 9, acceleration of front wheels 1 is suppressed to enable a smooth turn corresponding to the operation of steering wheel 9.

What is claimed is:

1. A working vehicle comprising:

an engine;

an engine speed sensor disposed at an output side of said engine;

a pair of right and left rear wheels driven by said engine;

brake means for braking said pair of right and left rear wheels independently of each other;

a pair of dirigible front wheels drivable by said engine;

control means operable, when said pair of front wheels are steered in excess of a predetermined angle, for setting an accelerating drive mode to rotate said front wheels at a substantially higher peripheral speed than said rear wheels; and inhibiting means for inhibiting a shift to said accelerating drive mode when an output from said engine speed sensor indicates that a rotating speed of said engine is below a predetermined value.

2. A working vehicle as defined in claim 1, wherein:

said control means is operable, when said front wheels are steered in excess of said predetermined angle, for causing said brake means to brake one of said rear wheels lying inwardly with respect to a steering direction; and said inhibiting means is further operable, when the rotating speed of said engine is below said predetermined value, for inhibiting said control means from controlling to brake said one of said rear wheels lying inwardly with respect to said steering direction.

3. A working vehicle as defined in claim 1, wherein said control means is operable, when said front wheels are steered in excess of said predetermined angle, for automatically raising an earth-working implement attached to said working vehicle to a set position.

4. A working vehicle as defined in claim 1, wherein said control means is operable for controlling drive of said pair of front wheels, in addition to said accelerating drive mode, selectively between an equal speed drive mode to rotate said front wheels at a substantially equal peripheral speed to said rear wheels, and a two wheel drive mode to allow said front wheels to rotate without drive from said engine.

5. A working vehicle comprising:

an engine;

an engine speed sensor disposed at an output side of said engine;

a pair of right and left rear wheels driven by said engine;

brake means for braking said pair of right and left rear wheels independently of each other;

a pair of dirigible front wheels drivable by said engine;

control means operable, when said pair of front wheels are steered in excess of a predetermined angle, for setting an accelerating drive mode to rotate said front wheels at a substantially higher peripheral speed than said rear wheels; and inhibiting means for canceling said accelerating drive mode when said front wheels are driven in said accelerating drive mode and an output from said engine speed sensor indicates that a rotating speed of said engine falls from above a predetermined value below said predetermined value.

6. A working vehicle as defined in claim 5, wherein:

said control means is operable, when said front wheels are steered in excess of said predetermined angle, for causing said brake means to brake one of said rear wheels lying inwardly with respect to a steering direction; and said inhibiting means is further operable, when the rotating speed of said engine is below said predetermined value, for inhibiting said control means from controlling to brake said one of said rear wheels lying inwardly with respect to said steering direction.

7. A working vehicle as defined in claim 5, wherein said control means is operable, when said front wheels are steered in excess of said predetermined angle, for automatically raising an earth-working implement attached to said working vehicle to a set position.

8. A working vehicle comprising:

an engine;

an engine speed sensor disposed at an output side of said engine;

a pair of right and left rear wheels driven by said engine;

brake means for braking said pair of right and left rear wheels independently of each other;

a pair of dirigible front wheels drivable by said engine;

control means operable, when said pair of front wheels are steered in excess of a predetermined angle, for setting an accelerating drive mode to rotate said front wheels at a substantially higher peripheral speed than said rear wheels; and inhibiting means for inhibiting said accelerating drive mode when an output from said engine speed sensor indicates that a rotating speed of said engine is below a predetermined value, and continuously inhibiting said accelerating drive mode when, with said accelerating drive mode being inhibited, the rotating speed of said engine is increased above said predetermined value.

9. A working vehicle as defined in claim 8, wherein:

said control means is operable, when said front wheels are steered in excess of said predetermined angle, for causing said brake means to brake one of said rear wheels lying inwardly with respect to a steering direction; and said inhibiting means is further operable, when the rotating speed of said engine is below said predetermined value, for inhibiting said control means from controlling to brake said one of said rear wheels lying inwardly with respect to said steering direction.

10. A working vehicle as defined in claim 9, wherein said control means is operable, when said front wheels are steered in excess of said predetermined angle, for automatically raising an earth-working implement attached to said working vehicle to a set position.

* * * * *